(12) United States Patent
Matsumoto

(10) Patent No.: US 6,231,149 B1
(45) Date of Patent: May 15, 2001

(54) METHOD AND APPARATUS FOR IMAGE PROCESSING AND IMAGE FORMING APPARATUS

(75) Inventor: Kazumasa Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/237,248

(22) Filed: Jan. 26, 1999

(30) Foreign Application Priority Data

Jan. 27, 1998 (JP) ................................................... 10-014365
Jan. 21, 1999 (JP) ................................................... 11-013098

(51) Int. Cl.⁷ .............................. B41J 29/38; B41J 2/205; H04N 1/21
(52) U.S. Cl. ................................ 347/5; 347/15; 358/1.16; 358/298
(58) Field of Search ................................. 347/43, 5, 15; 328/1.16, 1.17, 298

(56) References Cited

U.S. PATENT DOCUMENTS

| 4,313,124 | 1/1982 | Hara ........................................ 347/57 |
| 4,345,262 | 8/1982 | Shirato et al. ........................... 347/10 |
| 4,459,600 | 7/1984 | Sato et al. ................................ 347/47 |
| 4,463,359 | 7/1984 | Ayata et al. .............................. 347/56 |
| 4,525,729 | * 6/1985 | Agulnek et al. ................. 358/298 X |
| 4,558,333 | 12/1985 | Sugitani et al. ......................... 347/65 |
| 4,723,129 | 2/1988 | Endo et al. ............................... 347/56 |
| 4,740,796 | 4/1988 | Endo et al. ............................... 347/56 |
| 4,860,026 | 8/1989 | Matsumoto et al. .................... 347/15 |
| 5,481,293 | 1/1996 | Kanno .................................... 347/251 |
| 5,504,844 | * 4/1996 | Urda ...................................... 358/1.16 |
| 5,586,228 | * 12/1996 | Tokishige et al. ................... 358/1.16 |
| 5,672,016 | * 9/1997 | Miyano ............................... 347/43 X |

FOREIGN PATENT DOCUMENTS

| 0612181 | 8/1994 | (EP) . |
| 59-123670 | 7/1984 | (JP) . |
| 59-138461 | 8/1984 | (JP) . |

OTHER PUBLICATIONS

Robert Floyd and Louis Steinberg, "An Adaptive Algorithm for Spatial Grey Scale", Sid is Digest, CA, pp. 37–38, date:1975.*

* cited by examiner

*Primary Examiner*—David F. Yockey
(74) *Attorney, Agent, or Firm*—Fitzpatrick, Cella, Harper & Scinto

(57) ABSTRACT

Inputted multivalued image data is first stored in an image memory, and the multivalued image data is converted to binary data for driving each of a plurality of ink-jet head units, which discharge different colors of ink or ink with different densities, by referring to an ink-type distribution table based on the multivalued image data read out of the image memory. The converted binary data is stored in an address of the image memory, where the corresponding multivalued image data has been stored. The binary data stored in the image memory, each bit of which is to be outputted to each ink-jet head unit, is read out and outputted to the corresponding ink-jet head unit.

21 Claims, 12 Drawing Sheets

METHOD AND APPARATUS FOR IMAGE PROCESSING AND IMAGE FORMING APPARATUS

BACKGROUND OF THE INVENTION

The present invention relates to an image processing method and apparatus for converting multivalued image data to data corresponding to each recording element, and an image forming apparatus for inputting multivalued image data and forming an image.

Recently, as personal computers are widely used, various types of printers are used by general users. In these printers, there are increasing demands for high-speed printing, high resolution, high image quality, low noise and so forth. To satisfy such needs, there are printers employing the ink-jet printing method. Because of the relatively small size and low noise, printers employing the ink-jet printing method have rapidly become popular.

Many of the ink-jet printers utilize a printhead where a plurality of ink discharge orifices (printing elements) are integrally arrayed to improve printing speed, or utilize a plurality of printheads for color printing. Furthermore, to satisfy the needs for high resolution and high image quality, these ink-jet printers perform half-tone processing such as a dither method or an error diffusion method, as a method to faithfully reproduce tones of an original image. Based on image data on which such half-tone processing has been performed, printing is performed.

When printing is performed by print data processed by the above-described image processing method, if the resolution of a printing apparatus is high (1000 dot per inch (dpi) or more), supreme tone reproduction is possible. However, if the resolution of a printing apparatus is low (360 dpi to 720 dpi), dots in the highlighted portions become conspicuous, resulting in image coarseness due to non-uniformity of pixels. In order to increase the number of tones, the print dot itself is expressed in multivalues.

As a method of improving tone representation and obtaining an image having high density and wide range of tones by an ink-jet printer, a number of printing methods are proposed and put into practice. One is called a multi-droplet method where one dot is formed by discharging a plurality of ink droplets on substantially the same position of a print medium and tones of the dot are expressed by changing the number of ink droplets discharged on the dot. Another method utilizes plural types of ink having different densities. Tones of a dot are reproduced by combining at least two types of ink droplets having different densities of the same color group. Alternatively, a printing method combining the above-described two methods is also proposed and put into practice.

As a method of pseudo-tone reproduction, there is an error diffusion method (reference: R. Floyd & L. Steinberg, "An Adaptive Algorithm for Spatial Gray Scale" S1 D75 Digest, pp. 36–37). As an example of an image printing method utilizing the error diffusion method, "Multivalued Error Diffusion Method" by Katoh, Y. Arai, and Y. Yasuda (National Conference of Communication, Department in Showa 53 year, Society of Electronic Communication in Japan (1973), pp. 504 (Japanese)) is known. This method utilizes an error diffusion method utilizing a plurality of threshold values, whereas the conventional error diffusion method utilizes one fixed threshold value. For instance, assume that the range of image data is 0 to 255. Conventionally, "128" is set as a threshold value and the conventional error diffusion is performed to obtain binary data. However, according to the "Multivalued Error Diffusion Method" by Katoh, Y. Arai, and Y. Yasuda, in a case of using two types of ink having different densities, "85" and "175" are set as threshold values and ternary data is obtained for using the two types of ink in accordance with the print density.

Furthermore, an attempt has also been made recently to reproduce a high-quality image by obtaining multivalued data with three or more types of printing densities. For example, there is a method of using a combination of ink and film having an additive property to print a transmission image with multivalued dots. Herein, when the combination of ink and film achieves an additive property in printing a transmission image on a film by an ink-jet printing method, density is added up as ink droplets are superimposed plural times on the same pixel position (this density will be referred to as transmission density). An example of achieving an additive property is described hereinafter.

BJ transparent film CF-301 (manufactured by CANON) is used as a print sheet. On this film, dots are uniformly printed using 2% solution of a dye-type ink, C.I. Direct Black 19. As a result, an image having a transmission density of "0.8D" is obtained. Similarly, dots are uniformly printed using 1% solution of the C.I. Direct Black 19. As a result, an image having a transmission density of "0.4D" is obtained. If printing is performed by superimposing dots of these two types of ink, an image having a transmission density of "1.2D" can be obtained. It is confirmed from this experiment that the combination of the ink and film substantially obtains the transmission density in the range of "0" to "2.5D".

In a case of using such combination of the ink and film which achieves the additive property, the number of tones reproducible can be significantly increased by superimposing plural types of ink having different densities.

However, when printing is performed with the aforementioned image processing, inputted multivalued image data needs to be converted to binary data in correspondence with each ink-jet head (type of ink) The inputted multivalued image data is stored as multivalued data (e.g., 8 bits) in each address of an image memory. After the multivalued image data is developed into binary data by the error diffusion method or the like, the binary data is stored in a memory (bit plane memory) different from the aforementioned image memory, which corresponds to the type of ink or the number of ink-jet heads.

As described above, conventionally an image memory and a bit plane memory are separately constructed. Thus, if the types of ink or the number of ink-jet heads are to be increased, the number or the capacity of the bit plane memory must be increased for storing binary data.

SUMMARY OF THE INVENTION

The present invention is made in consideration of the above situation, and has as its object to provide an image processing method, an image processing apparatus, and an image forming apparatus for storing multivalued image data and binary data generated based on the multivalued image data, with a small memory capacity.

Furthermore, another object of the present invention is to provide an image processing method, an image processing apparatus, and an image forming apparatus for developing multivalued image data at high speed without necessitating a memory capacity increase due to an increase in the number of recording elements.

Moreover, another object of the present invention is to provide an image processing method, an image processing apparatus, and an image forming apparatus for storing binary data, developed from multivalued image data as print data for each recording element, in an address of the memory storing the multivalued image data, so as to develop the multivalued image data to binary data at high speed with a small memory capacity.

Still further, another object of the present invention is to provide an image processing method and apparatus for developing multivalued color image data to binary data with a small memory capacity by storing the generated binary data, corresponding to each recording element, in an address of a memory storing the multivalued color image data represented by a plurality of color components, and to provide an image forming apparatus for forming (recording) a color image based on the generated binary data.

Furthermore, another object of the present invention is to provide an image processing method, an image processing apparatus, and an image forming apparatus for forming (recording) a color image having high quality and wide range of tones by generating recording data for each recording element in units of color component of color image data.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings. Note that the "color" and "type" of the ink in the present embodiment are expressions inclusive of light and dark of ink.

First Embodiment

As a first embodiment of the present invention, description will be provided in a case where a transmission image is printed by using a combination of ink and film having an additive property. For this print operation, eight ink-jet head units and five types of ink (D1–D5) are used to form an image. Note, there are two ink-jet head units which discharge each type (D3, D4 and D5) of ink, respectively.

Figure 3:
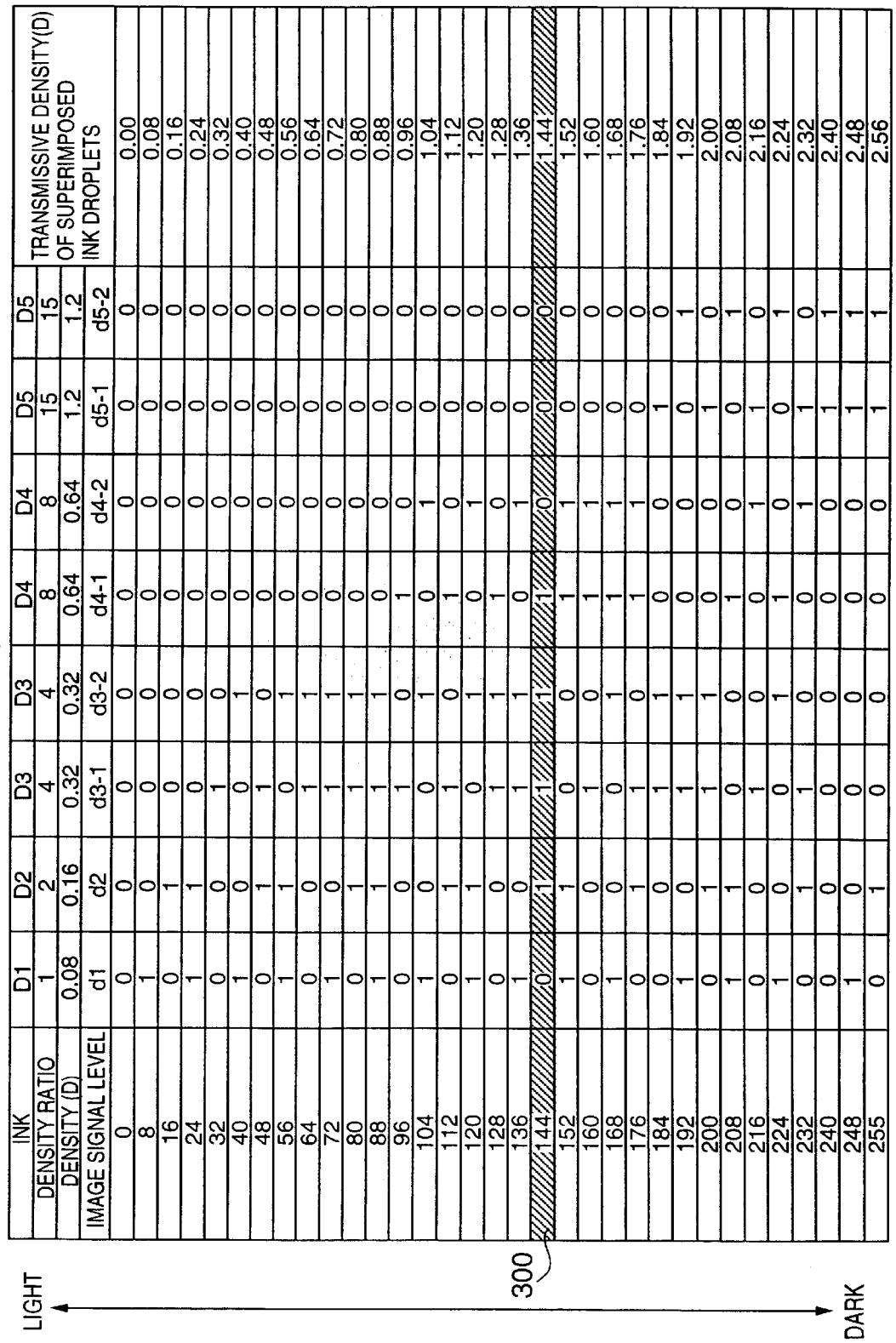
FIG. 3 is an example of an ink-type distribution data table according to the first embodiment.

FIG. 3 shows an ink-type distribution data table being used to select head unit(s) of the eight ink-jet head units (recording elements) in accordance with an image signal level, transmission density of the five types of ink (ink D1, D2, D3, D4 and D5), and transmission density of superimposed discharge by a combination of ink in accordance with the distribution data, according to the first embodiment. Note that in order to simplify the description, it is assumed that the transmission density of a transparent film serving as a recording medium is "0D".

Each transmission density of the ink D1, D2, D3, D4 and D5 expresses the density obtained when an ink-jet printing apparatus performs 100% solid-color printing using the respective ink only. The density ratio of the ink D1, D2, D3, D4 and D5 is set to "1:2:4:8:15". Image density signals (multivalued image data) are expressed by 8 bits, wherein a smaller value expresses the lower density (thin) and a larger value expresses the higher density (thick).

Referring to FIG. 3, each of data d1, d2, d3-1, d3-2, d4-1, d4-2, d5-1, d5-2 corresponds to each ink-jet head unit, and represents data (driving data) indicative of ink discharge/ink not discharge in correspondence with each image signal level (density). The data d1 corresponds to an ink-jet head unit discharging the ink D1; the data d2 corresponds to an ink-jet head unit discharging the ink D2; the data d3-1 and d3-2 correspond to an ink-jet head unit discharging the ink D3; the data d4-1 and d4-2 correspond to an ink-jet head unit discharging the ink D4; and the data d5-1 and d5-2 correspond to an ink-jet head unit discharging the ink D5. If the data is "1", the corresponding ink-jet head unit is driven and ink is discharged from the corresponding ink-jet head, while if the data is "0", ink is not discharged.

For example, if the image signal level is "144" (numeral 300 in FIG. 3), the driving data is "01111000" in the order from D1 to D5. Therefore, the ink D3 (d3-1 and d3-2) is discharged twice, the ink D2 (d2) is discharged once, and the ink D4 (d4-1) is discharged once, all superimposed on a pixel position representing the density "144". As described above, by setting the density ratio of the ink D1, D2, D3, D4 and D5 to "1:2:4:8:15" and by changing the combination of ink discharge/ink not discharge of each ink, 8-bit image signal levels can be expressed in 33 tone levels as shown in FIG. 3, from the density "0D" to "2.56D".

Note that, herein, four times of superimposition of ink discharge is possible at the maximum on a single-pixel position without overflow of ink on a recording medium. In addition, when the additive property is attained, tone levels are expressed by changing the combination of ink discharge, setting the density ratio of the ink D1, D2, D3, D4 and D5 to "1:2:4:8:15."

Figure 1:
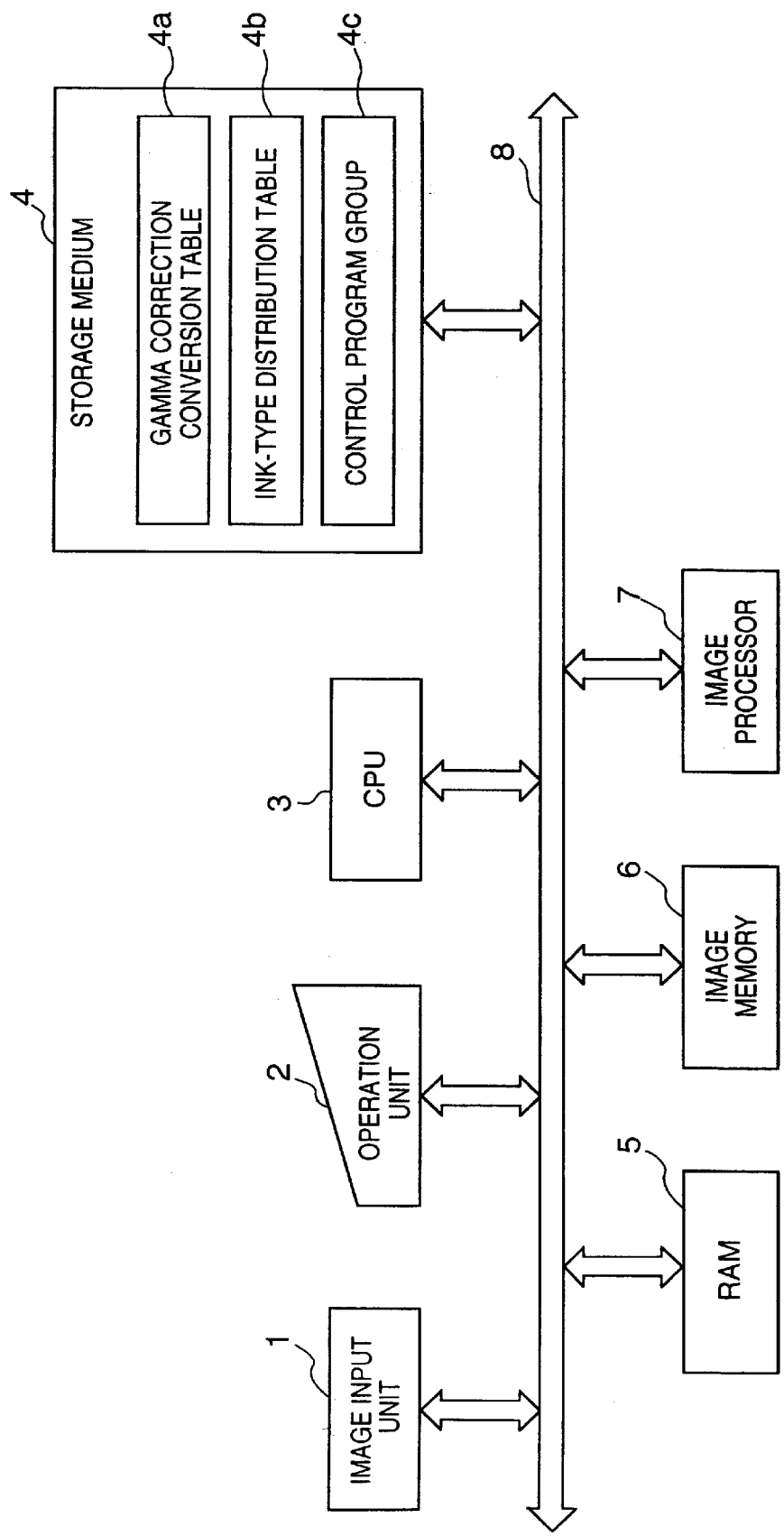
FIG. 1 is a block diagram showing a construction of an image processing apparatus according to a first embodiment of the present invention.

FIG. 1 is a block diagram showing a construction of an image processing apparatus according to the first embodiment of the present invention. The image processing apparatus may be provided inside an image forming apparatus, e.g., a copy machine or ink-jet printer or the like, or may be provided in a computer such as a host computer or the like.

In FIG. 1, reference numeral 1 denotes an image input unit, e.g., a scanner or the like, for inputting color image data by reading a color original image or inputting data through a communication line or other devices. Reference numeral 2 denotes an operation unit comprising various keys for setting various parameters or instructing the start of printing. Reference numeral 3 denotes a CPU which controls the entire image processing apparatus in accordance with various programs of a control program group 4c stored in a storage medium 4.

The storage medium 4 stores programs for operating the image processing apparatus in accordance with a control program and error processing programs. The operation according to the first embodiment is all executed based on this control program. For such storage medium 4, various ROMs utilizing semiconductors, floppy disk (FD), CD-ROM, hard disk (HD), memory card, or optical disk or the like may be used. In the storage medium 4, reference numeral 4a denotes a gamma correction conversion table; 4b, an ink-type distribution table which is referred to in the ink-type distribution process that will be described later; and 4c, a program group storing various programs.

A RAM 5 is used as a work area during execution of various programs stored in the control program group 4c in the storage medium 4, or used as a temporary saving area during error processing or as a work area during image processing. An image memory 6 stores image data (multivalued image data) inputted from the image input unit 1. An image processor 7 generates binary data (discharge pattern) which realizes image printing in multi-tone levels by the image forming (printing) apparatus e.g., an ink-jet printing apparatus or the like, based on the multivalued image data stored in the image memory 6. Reference numeral 8 denotes a system bus which transmits address signals, data, control signals or the like in the present apparatus.

Figure 2:
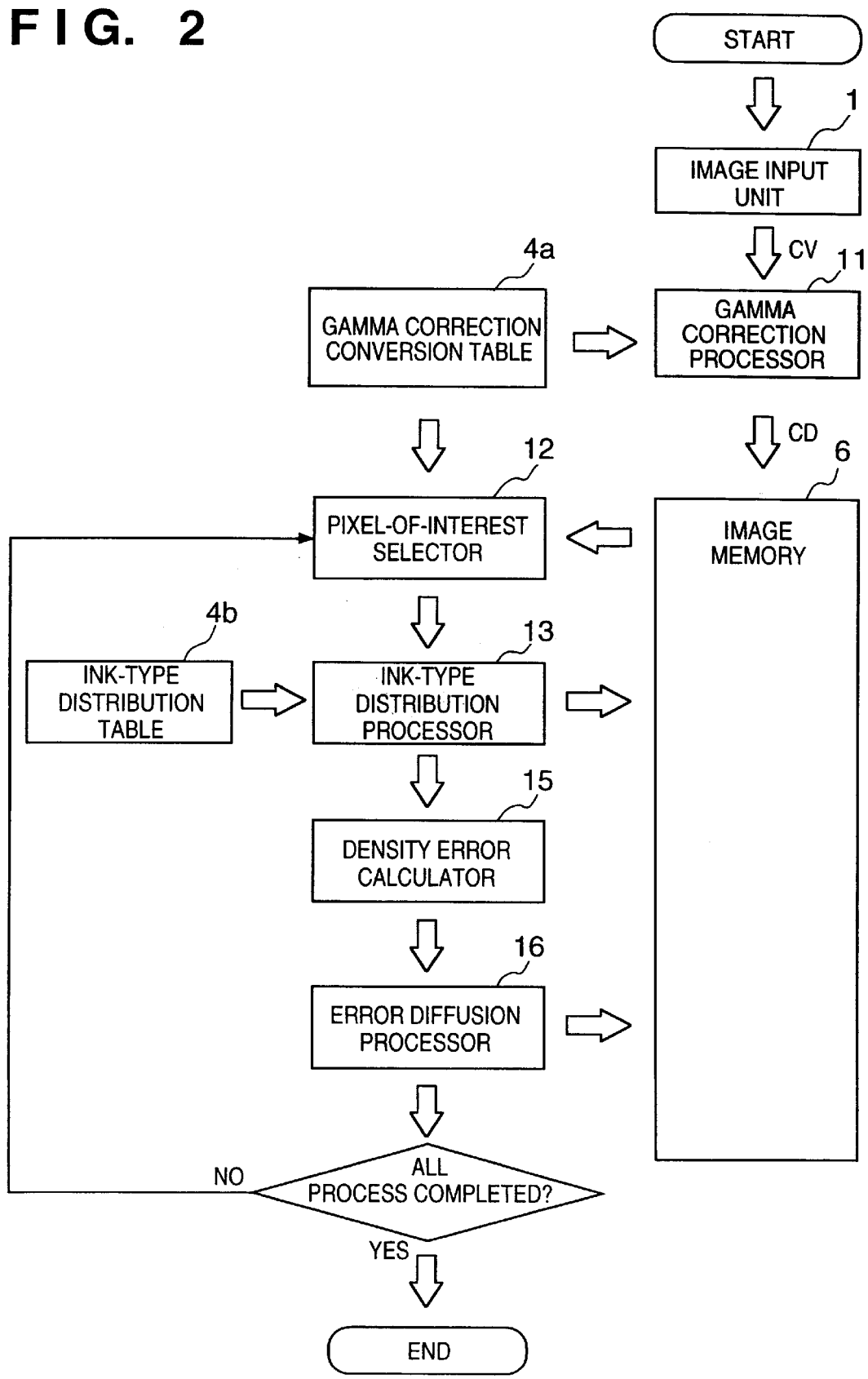
FIG. 2 is an explanatory diagram showing an example of an image process performed by the image processing apparatus according to the first embodiment.

FIG. 2 is an explanatory diagram describing an image process performed by the image processor 7 of the image processing apparatus according to the first embodiment.

First, a gamma correction processor 11 converts an image signal CV, inputted from the image input unit 1, into a signal CD, indicative of density, by utilizing the gamma correction conversion table 4a, and the converted signal is stored in the image memory 6.

A pixel-of-interest selector 12 sequentially selects one pixel (pixel of interest) to be processed from the image memory 6, and obtains the density data CD of the selected pixel. The density data of the pixel is sent to an ink-type distribution processor 13. Based on the CD value of the pixel of interest, the ink-type distribution table 4b is referred to, and an ink combination candidate which is most appropriate to express the density CD of the pixel of interest is selected. More specifically, based on the above-described ink-type distribution table 4b shown in FIG. 3, binary data d1, d2, d3-1, . . . , d5-2, each indicating ink discharge/ink not discharge for each ink-jet head unit, are determined. The obtained binary data d1, d2, d3-1, . . . , d5-2 are weighted and stored in a predetermined bit position of an address of the pixel of interest.

Next, a density error calculator 15 calculates a difference between a density expressed by the combination of the type(s) of ink determined by the ink-type distribution processor 13 and a density value (value CD) of the pixel of interest. Then, an error diffusion processor 16 executes the so-called error diffusion process in which the difference value calculated by the density error calculator 15 is diffused to periphery pixels of the pixel of interest in the image memory 6 in accordance with a distribution coefficient.

The above described process is performed on all pixels of the multivalued image data in the image memory 6. By this, binary data which determine the amount of ink discharge in accordance with the density value of a pixel of interest are obtained and stored in the image memory 6. Based on the determined binary data, ink is discharged from each of the ink-jet head unit and density of the original multivalued image data is faithfully reproduced.

Figure 4:
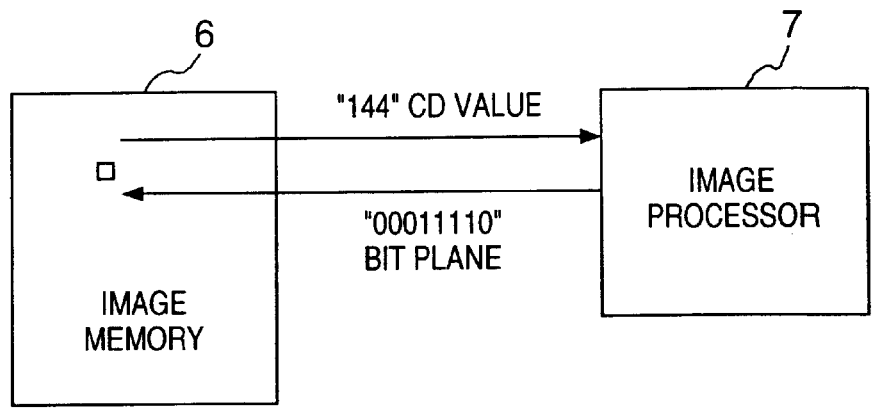
FIG. 4 is a conceptualized view of memory operation at the time of generating bit plane data according to the first embodiment.

FIG. 4 is a conceptualized view of memory operation at the time of generating a bit plane by the image process according to the first embodiment.

Density data CD of each pixel of the multivalued image data stored in the image memory 6 is read out and processed by the image processor 7. As a result, a bit plane for each ink-jet head unit is generated in the image memory 6. More specifically, binary data, indicating ink discharge/ink not discharge for each ink-jet head unit, generated for a density value of a pixel of interest in the image memory 6, is stored in an address where the density data (multivalued image data) of the pixel of interest has been stored, and the density data CD of the pixel is rewritten to plane data (binary data). In other words, referring to the example in FIG. 4, when the density value of the pixel data read out of the image memory 6 is "144", the density data is converted to 8-bit plane data "01111000" for binary data d1, d2, d3-1, d3-2, d4-1, d4-2, d5-1 and d5-2, and the converted data is stored in the address of the image memory 6 where the density data of the pixel has been stored.

Figure 5:
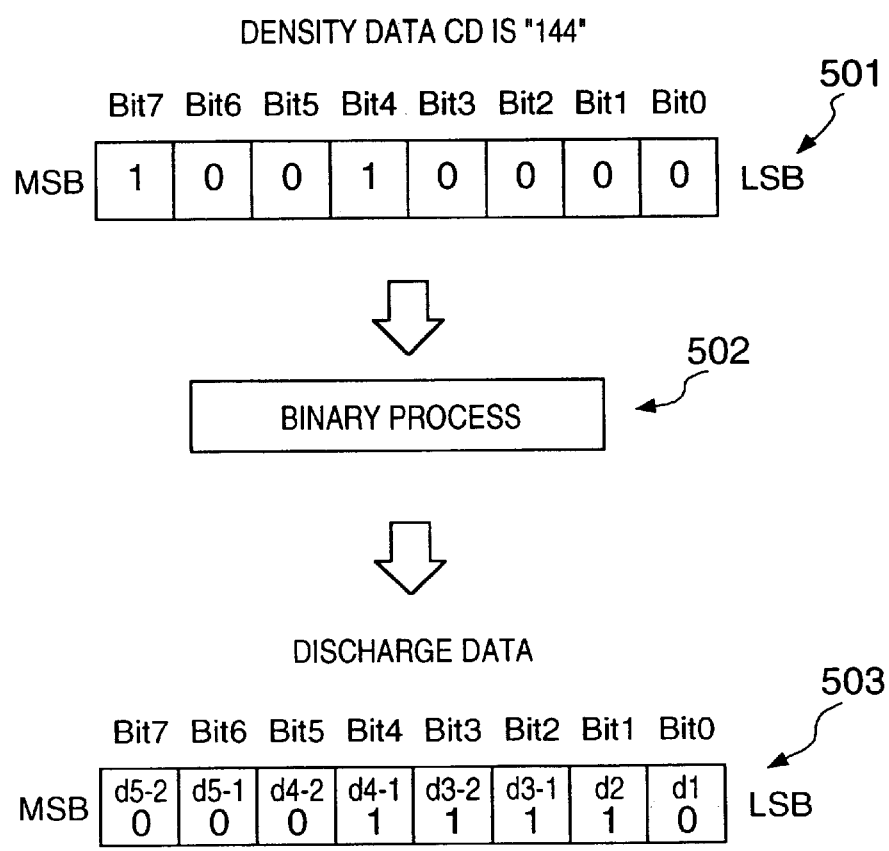
FIG. 5 is a view explaining bit assignment in an image memory according to the first embodiment.

FIG. 5 is a view explaining how contents of the image memory 6 storing the pixel of interest described in FIG. 4 are changed by the binary process of the image processor 7. FIG. 5 shows a case where the value of the density data CD of the pixel of interest is "144".

Referring to FIG. 5, reference numeral 501 denotes density data "144 (decimal number)" expressed in binary numbers, and the value is "10010000". The density data (binary data) of the pixel of interest is stored as 8-bit data in the image memory 6. Reference numeral 502 denotes a binary process performed by the aforementioned image processor 7, in which the 8-bit density data 501 is converted to binary data "00011110" (503), indicative of ink discharge/ink not discharge, based on the ink-type distribution table 4b shown in FIG. 3. As has been described above, each bit of the binary data 503 corresponds to each ink-jet head unit. Herein, starting from the MSB (Bit 7), each bit corresponds to the data d5-2, d5-1, d4-2, d4-1, d3-2, d3-1, d2 and d1.

Figure 6:
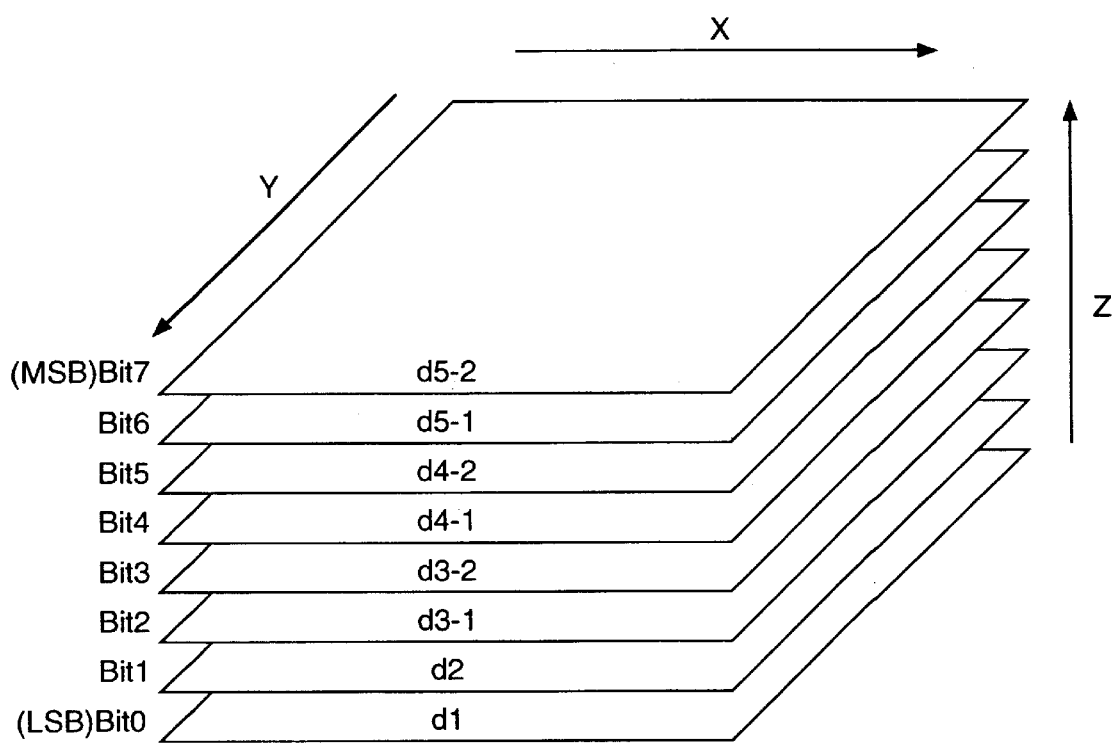
FIG. 6 is a conceptualized view of a plurality of bit planes layered in the image memory of the first embodiment.

When the above-described process is performed on all pixels of the multivalued image data stored in the image memory 6, as described above, bit planes for respective ink-jet head units are generated in the image memory 6 such that the bit planes are layered in accordance with the bit position of each address as shown in FIG. 6.

More specifically, referring to FIG. 6, a bit plane layer, corresponding to each ink-jet head unit is formed in the X-Y plane (address space of the image memory 6), and each plane is layered in Z direction (order of bit positions). In the example shown in FIG. 6, a bit plane for the ink-jet head unit which discharges the ink D1 (d1) is positioned in the lowest layer (LSB: Bit 0). On top of this layer (Bit 1), a bit plane for the ink-jet head unit which discharges the ink D2 (d2) is positioned. Further, on top of this layer (Bit 2), a bit plane for the ink-jet head unit which discharges the ink D3 (d3) is positioned. In a similar manner, bit planes for ink-jet head units which respectively discharge the ink D3 (d3-2), D4 (d4-1, d4-2), and D5 (d5-1) are positioned. In the highest layer (MSB: Bit 7), a bit plane for the ink-jet head unit which discharges the ink D5 (d5-2) is positioned.

In other words, according to the present embodiment, while density data of the pixel of interest is 8-bit data, the number of bits for ink-type distribution is also 8 bits (d1 to d5-2). Therefore, it is possible to store converted binary data in the image memory 6 where density data has been stored.

Figure 7:
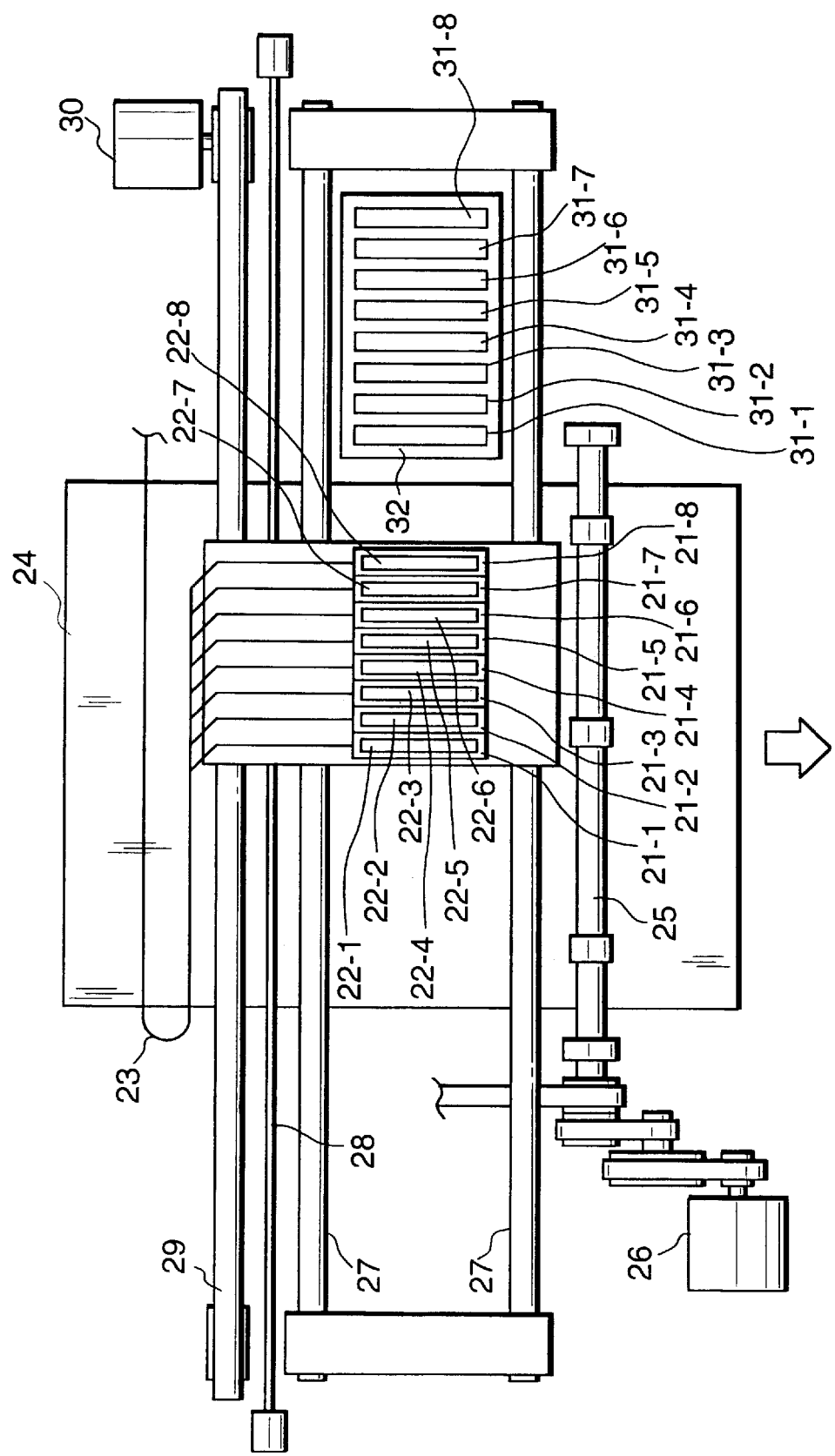
FIG. 7 is an outer appearance showing a main portion of an ink-jet printing apparatus according to the first embodiment.

FIG. 7 is a structural view of a main portion of an ink-jet printing apparatus (printer) comprising the image processing apparatus according to the first embodiment.

The ink-jet printer forms a multi-tone image by discharging ink from ink discharge orifices in accordance with discharge control signals for each ink-jet head unit based on 8-bit binary data (d1, d2, d3-1, . . . , d5-2). Note that the timing of these plurality of ink-jet head units is controlled by a delay circuit (not shown), based on the control signals which are delayed in accordance with the position of each ink-jet head unit, so that each of the ink discharge orifices superimposingly discharges ink onto the same pixel position.

Eight ink-jet head units 21-1 to 21-8 are provided on the carriage 20. Each of the ink-jet head units 21-1 to 21-8 (as a whole, referred to as ink-jet head unit 21) comprises discharge orifice arrays for discharging ink, and the discharge orifice arrays are positioned with predetermined spaces. Ink provided to nozzle arrays corresponding to each of the ink-jet head units 21-1 to 21-8 is supplied from corresponding ink cartridge 22 (22-1 to 22-8). Each of the ink cartridge 22-1 to 22-8 supplies respective the ink D1, D2, D3, D4 and D5. Note in FIG. 7, a portion of the carriage 20, corresponding to each head of the ink-jet head unit 21, is open so that ink discharged by each ink-jet head unit can reach a recording medium 24.

Print signals and control signals are sent to the ink-jet head unit 21 through a flexible cable 23. The recording medium 24, such as print paper or a thin plastic plate or the like, is gripped by a discharge roller 25 through a conveyance roller (not shown), and transferred in the direction of an arrow in FIG. 7 by rotation of a conveyance motor 26. The carriage 20 is guided and supported by a guide shaft 27 and linear encoder 28. By driving a carriage motor 30, the carriage 20 reciprocally moves along the guide shaft 27 via a driving belt 29.

In the internal portion (liquid channel) of the ink discharge orifices of the ink-jet head unit 21, heating elements (electrothermal transducer) generating heat energy for discharging ink are provided. In accordance with a signal output timing of the linear encoder 28 whose output changes in accordance with the movement of the carriage 20, these heating elements are driven based on printing signals. By discharging ink droplets of the ink D1, D2, D3, D4 and D5 on the recording medium 24, an image is formed on the recording medium 24.

At a home position of the carriage 20, which is set outside a print area of the recording medium 24, a recovery unit 32 comprising a cap unit 31 (31-1 to 31-8) is arranged. When printing is not performed, the carriage 20 is moved to the home position so that the caps 31-1 to 31-8 of the cap unit 31 tightly close the ink discharge orifice surfaces of the corresponding ink-jet head unit 21. By virtue of this, it is possible to prevent ink coagulation caused by evaporation of ink solvent or clogging of nozzles (ink discharge orifices) due to dust or foreign materials.

The capping function of the cap unit 31 is utilized for preliminary discharge, where ink is discharged onto the cap unit 31 which is away from the ink discharge orifices, so as to recover poor discharge performance or clogging of ink discharge orifices having a low print frequency. The capping function is also utilized to suck ink from an ink discharge orifice by activating a pump (not shown) while the cap unit is capping the front surface of the ink-jet head unit, so as to recover poor discharge condition of the discharge orifice.

By providing a blade (not shown) or a wiping member near the cap unit 31, the surface of the ink discharge orifices of the ink-jet head unit can be cleaned. Japanese Patent Application Laid-Open No. 7-125262 discloses detailed descriptions on such internal construction of the ink-jet head unit.

Figure 8:
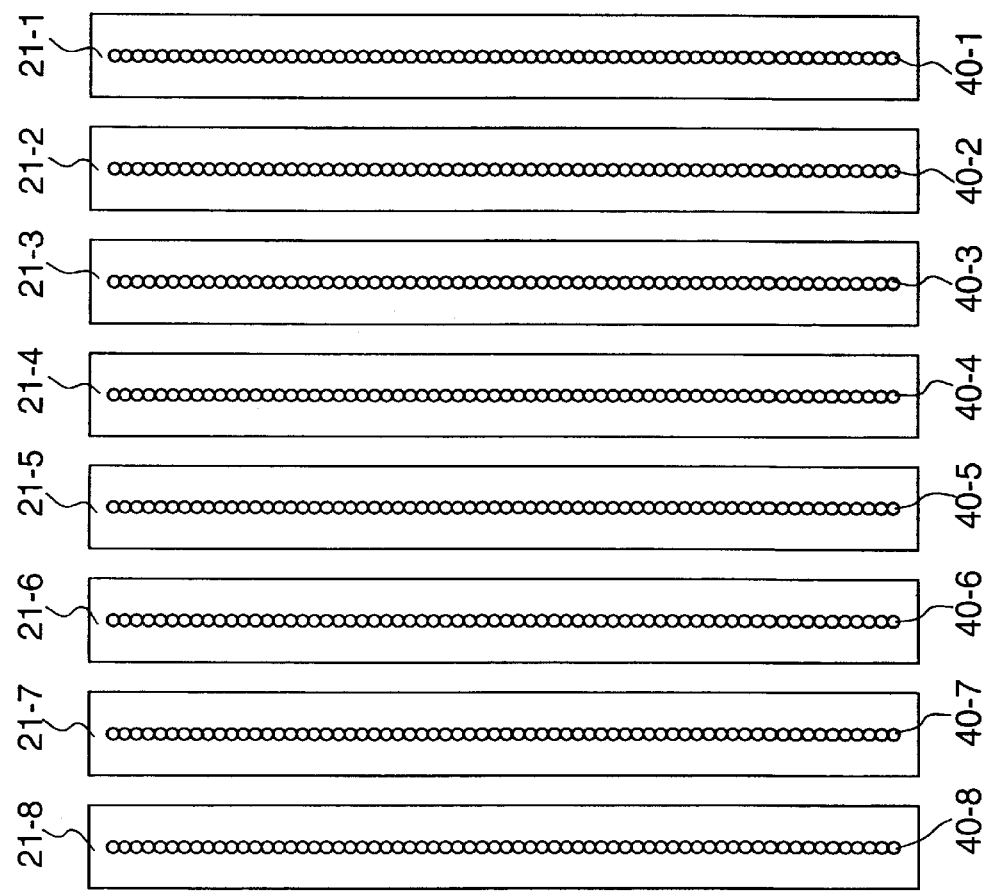
FIG. 8 is an explanatory view showing an arrangement of ink discharge orifice arrays of ink-jet head units of the ink-jet printing apparatus according to the first embodiment.

FIG. 8 is an external view showing an arrangement of ink discharge orifice (nozzle) arrays of the ink-jet head units 21-1 to 21-8. Herein, the ink-jet head units 21-1 to 21-8 are seen from the side of the recording medium 24.

In the ink-jet head unit 21, reference numerals 40-1 to 40-8 denote ink discharge orifice arrays for discharging the ink D1 to D5 respectively. The discharge orifice arrays of each ink-jet head unit comprise 256 discharge orifices at 600 dots per inch (600 dpi). By arranging such ink-jet head unit which can discharge plural types of ink in the main scanning direction, five types of the ink D1 to D5 can be superimposingly discharged in one scan. Therefore, it is possible to print an image having wide range of tones without increasing the printing time.

Second Embodiment

Next, a second embodiment of the present invention will be described.

In the second embodiment, description will be provided in a case where a transmission image is printed by using a combination of ink and film having an additive property. Herein, an image is formed by utilizing 16 ink-jet head units (not shown) with five types of black (K) ink, three types of cyan (C) ink, three types of magenta (M) ink, and two types of yellow (Y) ink.

Herein, the types of K ink used are K1, K2, K3, K4 and K5, and the density ratio of these types of black ink is "1:2:4:8:15" similar to the first embodiment. The types of C ink used are C1, C2 and C3, and the density ratio of these types of cyan ink is "1:2:4". The types of M ink used are M1, M2 and M3, and the density ratio of the types of magenta ink is "1:2:4". The types of Y ink used are Y1 and Y2, and the density ratio of these types of yellow ink is "1:2".

Figure 9:
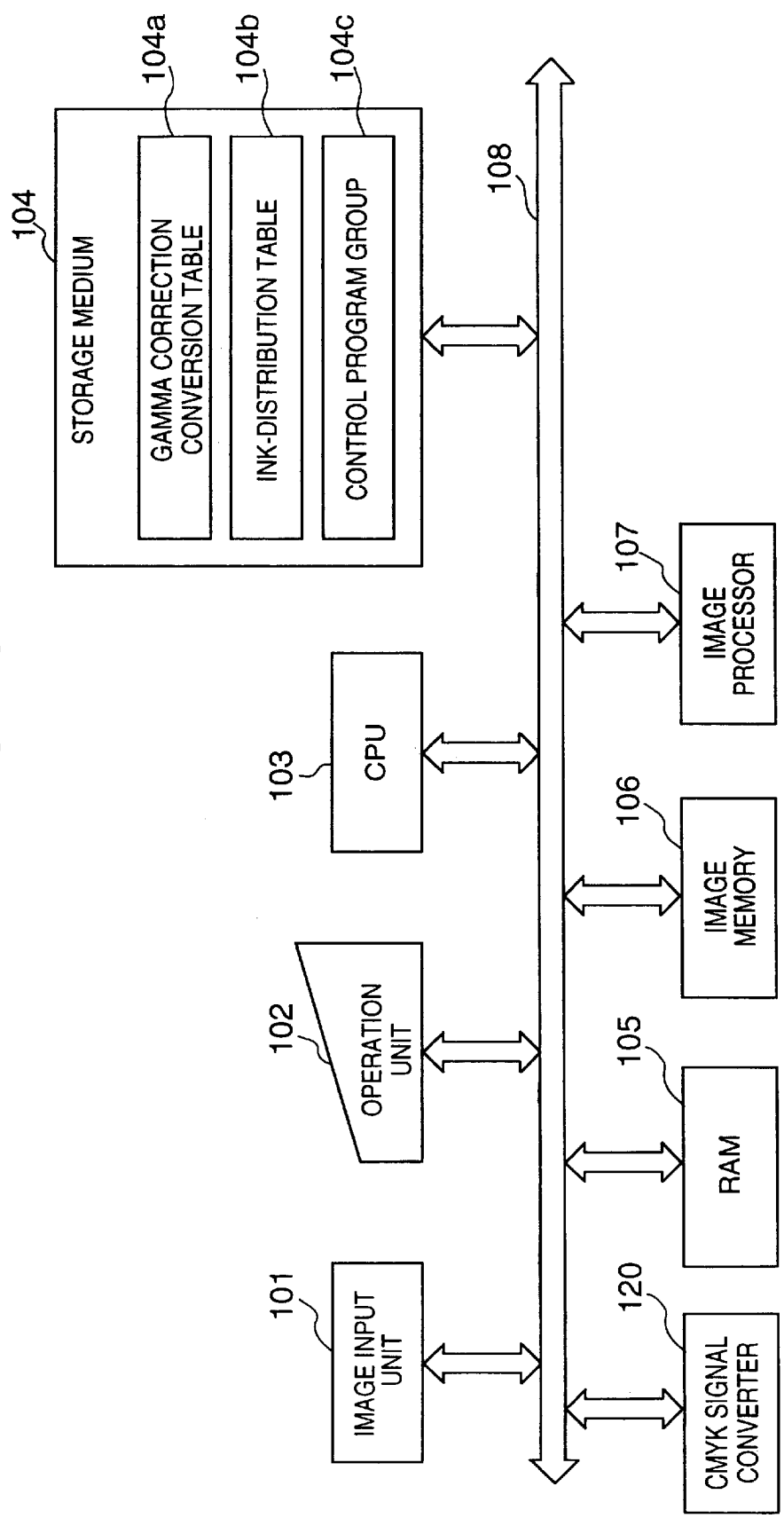
FIG. 9 is a block diagram showing a construction of an image processing apparatus according to a second embodiment of the present invention.

FIG. 9 is a block diagram showing a construction of an image processing apparatus according to the second embodiment. The image processing apparatus may be provided inside an image forming apparatus, e.g., a copy machine or ink-jet printer or the like, or may be provided in a computer such as a host computer or the like.

Since reference numerals 101 to 108 in FIG. 9 correspond to reference numerals 1 to 8 in FIG. 1 respectively, description thereof will be omitted. Reference numeral 120 denotes a CMYK signal converter for converting R, G and B signals to Y, M, C and K signals to be outputted. The ink-type distribution table 104b is provided for five types of black (K) ink, three types of cyan (C) ink, three types of magenta (M) ink, and two types of yellow (Y) ink, as described above. The main construction of the ink-jet printing apparatus (printer) comprising the image processing apparatus according to the second embodiment differs from that of the first embodiment (FIG. 7), only by the number of ink-jet head units provided and ink-jet head units for color printing. Therefore, drawings and description thereof will not be provided herein.

Figure 10:
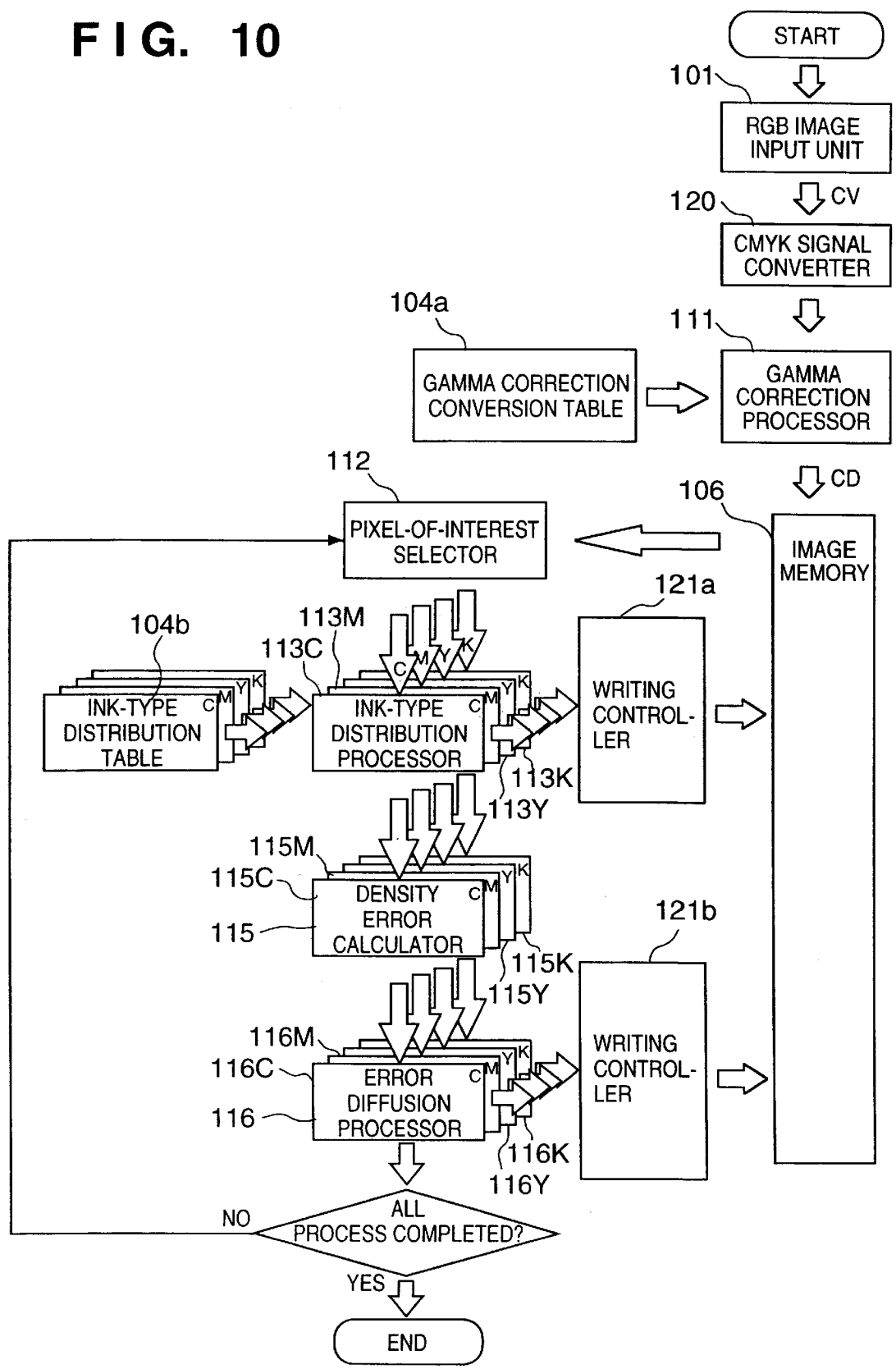
FIG. 10 is an explanatory diagram showing an example of an image process performed by the image processing apparatus according to the second embodiment of the present invention.

FIG. 10 is an explanatory diagram describing an image process performed by the image processor 107 of the image processing apparatus according to the second embodiment of the present invention.

First, R, G and B signals inputted from an RGB image input unit are converted to C, M, Y and K signals by the CMYK signal converter 120. Then, a gamma correction processor 111 converts luminance signals to density data CD indicative of density by utilizing a gamma correction conversion table 104a. In the second embodiment, one pixel is represented by C, M, Y and K data each having 8 bits. One pixel data having 32 bits is stored in an image memory 106. In the CMYK signal converter 120, R, G and B image signals are separated into color areas and monochrome areas.

In the monochrome area, light and dark portions are expressed by superimposing five types of K ink each having different densities, while in the color areas, light and dark portions are expressed by superimposing respective types of colors of C, M and Y ink.

A pixel-of-interest selector 112 sequentially selects from the image memory 106, one pixel (pixel of interest) to be processed and the peripheral pixels subjected to diffusion by error diffusion process, and obtains C, M, Y and K density data (CD) of the selected pixels. Each of the C, M, Y and K density data is divided into 8 bits of density data by the pixel-of-interest selector 112, and each of the C, M, Y and K data is sent to an ink-type distribution processor 113.

Although the basic flow of the process for each color is the same as that of the above-described first embodiment, the second embodiment differs from the first embodiment in the point that the process is separate for each of the C, M, Y and K colors and that these separate processes are performed in parallel. For instance, the ink-type distribution processor 113C for processing C data refers to the ink-type distribution table 104b based on a cyan CD value for the pixel of interest, and selects an ink combination candidate which is most appropriate to express the density value of the pixel of interest. More specifically, binary data Cd1, Cd2 and Cd3, indicative of C-ink discharge/C-ink not discharge, are determined for each ink-jet head unit in accordance with the C density signal levels. The binary data Cd1, Cd2 and Cd3 obtained in this manner are weighted similar to the binary data (d1 - d5-2) in the above-described first embodiment and sent to a writing controller 121a.

Similarly, in the ink-type distribution processor 113M for processing M data, binary data Md1, Md2 and Md3 indicative of M-ink discharge/M-ink not discharge are generated, and in the ink-type distribution processor 113Y, binary data Yd1 and Yd2 indicative of Y-ink discharge/Y-ink not discharge are generated. Furthermore, in the ink-type distribution processor 113K, binary data Kd1, Kd2, Kd3-1, Kd3-2, Kd4-1, Kd4-2, Kd5-1 and Kd5-2 are generated. Each of these binary data are weighted and sent to the writing controller 121a.

In the writing controller 121a, the data sent from the four distribution processors 113C, 113M, 113Y and 113K is synthesized and stored in a predetermined bit position of an address of the pixel of interest.

Next, a density error calculator 115C for C data calculates the difference between the density value (CD value) of the pixel of interest and the density expressed by the ink combination which has been determined by the ink-type distribution processor 113C. Then, an error diffusion processor 116C for C data executes so-called the error diffusion process in which the difference value calculated by the density error calculator 115C is diffused to periphery pixels of the pixel of interest in accordance with a distribution coefficient. The periphery pixel data, to which errors are diffused in the foregoing manner, is sent to a writing controller 121b. Similarly, with respect to the periphery pixel data for M, Y and K, the density error calculator 115M for M data, density error calculator 115Y for Y data, and density error calculator 115K for K data respectively calculate density errors; then the error diffusion processor 116M for M data, error diffusion processor 116Y for Y data, and the error diffusion processor 116K for K data respectively diffuse the errors to periphery pixels of the pixel of interest; and the resultant data is sent to the writing controller 121b. In the writing controller 121b, the data sent by the four error diffusion processors 116C, 116M, 116Y and 116K are synthesized and stored in predetermined bit positions of respective addresses of the periphery pixels of the pixel of interest.

The above described process is performed on all pixels of the multivalued image data stored in the image memory 106. By this, binary data which determine the amount of ink discharge in accordance with the density value of a pixel of interest are obtained and stored in the image memory 106. Based on the determined binary data, ink is discharged from each of the ink-jet head unit and density of the original multivalued image data is faithfully reproduced.

Figure 11:
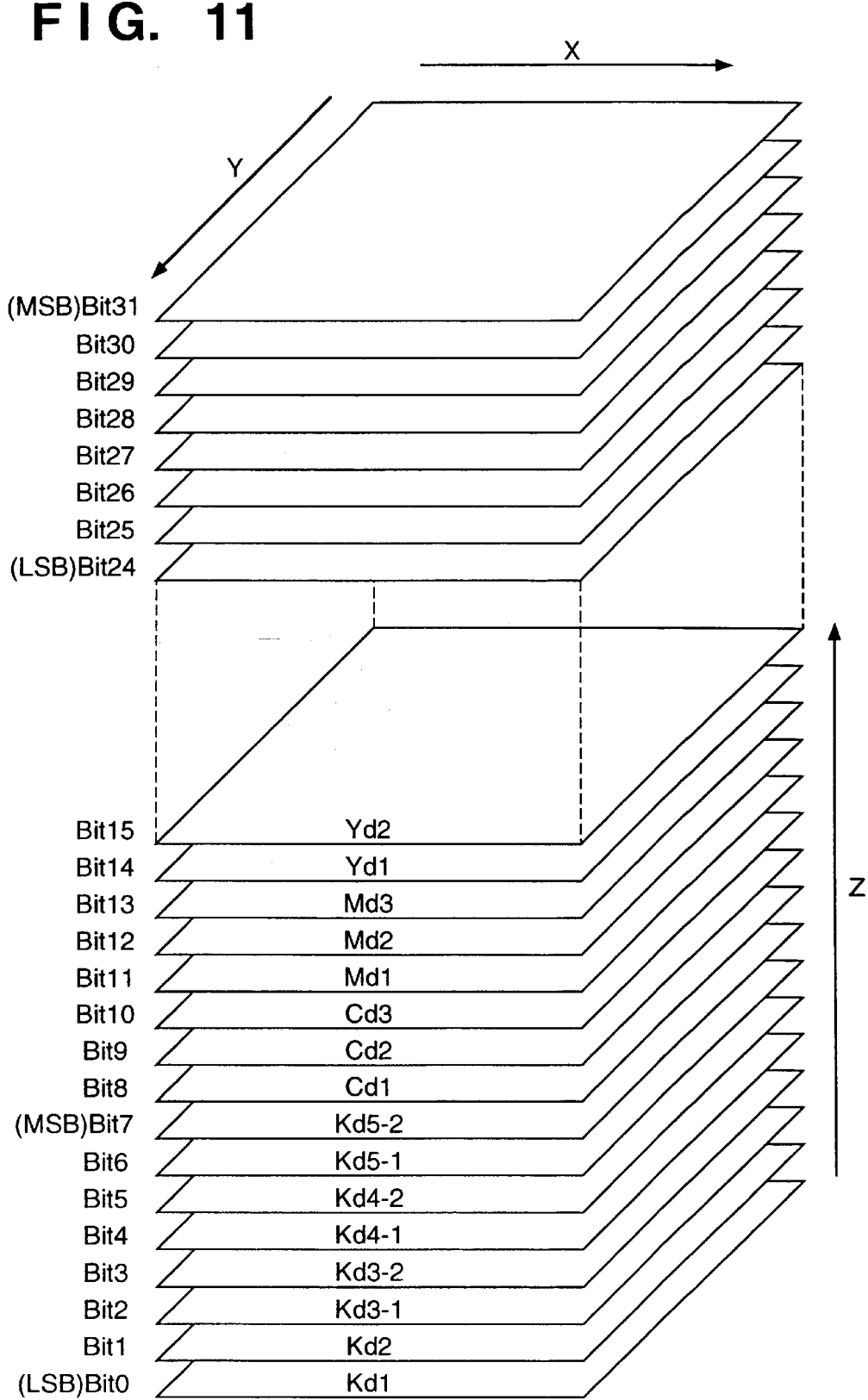
FIG. 11 is a conceptualized view of a plurality of bit planes layered in the image memory of the second embodiment.

When the above-described process is performed on all pixels of the multivalued image data as described above, bit planes for respective ink-jet head units are generated in the image memory 106 such that the bit planes are layered in accordance with the bit position of each address as shown in FIG. 11.

Note that the above descriptions in the first and second embodiments are provided assuming that the pixel density of image data is expressed by 8 or 32 bits. However, the present invention is not limited to this, and may be 12 bits as in a medical image or other bits.

Furthermore, in the foregoing embodiments, the number of planes stored in the image memories 6 and 106 is the same as the number of bits in one address of the image memories 6 and 106. However, the present invention is not limited to this. The number of planes may be lower than the number of bits in an address of the image memories 6 and 106.

Moreover, in the above-described embodiments, image data corresponding to a sheet of image is processed all at once. However, in a case where image data is outputted plane by plane to a serial printer such as an ink-jet printer, image data corresponding to a sheet of image may be divided into plural bands (band division) in accordance with the scan of the serial printer in the main scanning direction.

Furthermore, in the above-described embodiments, the image memories 6 and 106 are assumed to be a rewritable semiconductor memory (RAM). However, the image memory is not limited to a RAM, but may be a virtual memory utilizing a rewritable storage medium such as hard disk.

Figure 12:
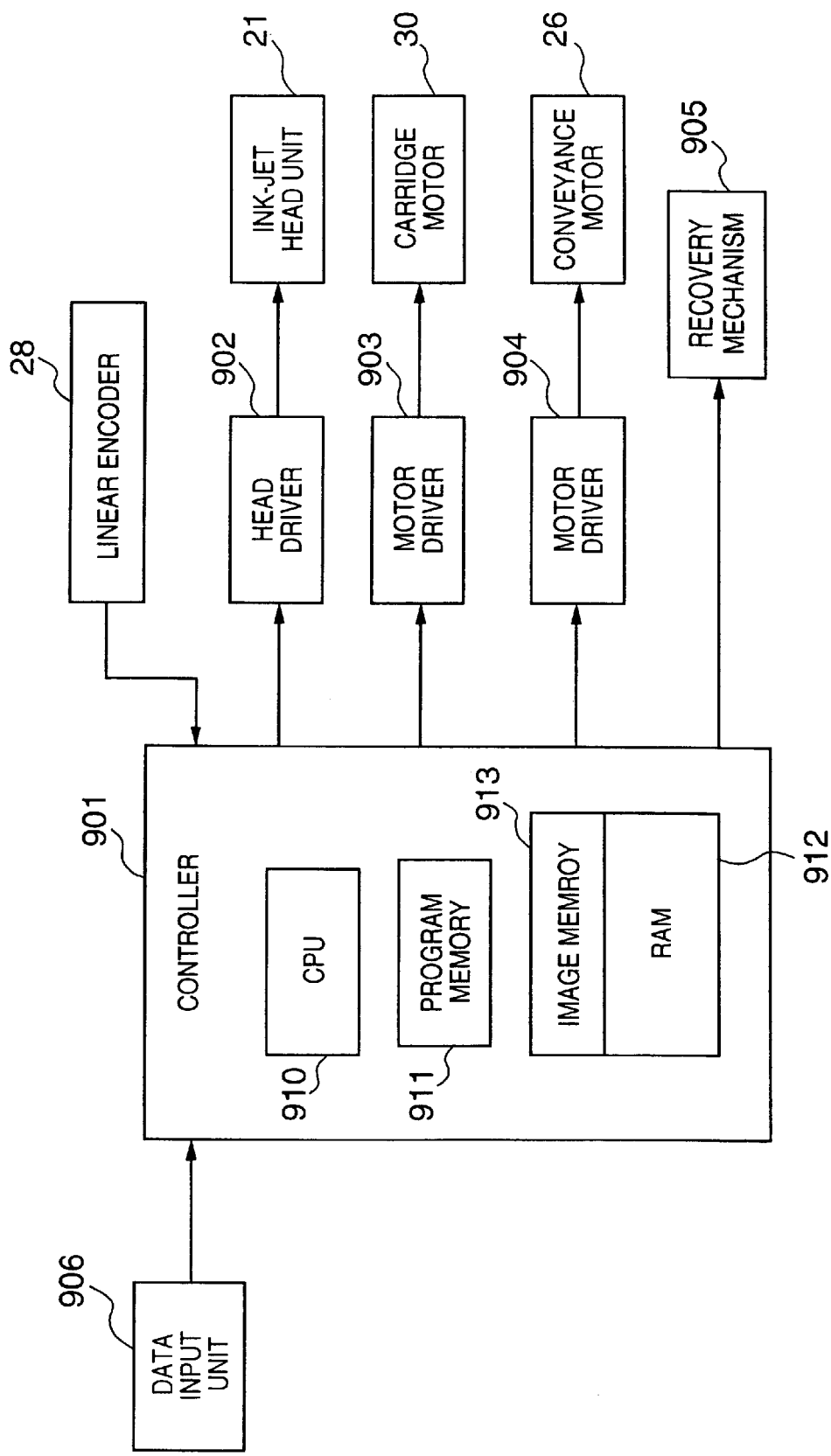
FIG. 12 is a block diagram showing a construction of an ink-jet printing apparatus according to the present embodiment.

FIG. 12 is a block diagram showing a construction of an ink-jet printing apparatus according to the present embodiment. For descriptions common to FIG. 7, the same reference numerals are given and description thereof will not be provided herein.

In FIG. 12, reference numeral 901 denotes a controller for controlling operation of the entire apparatus, which comprises a CPU 910 such as a microprocessor or the like, a program memory 911 storing programs executed by the CPU 910, and a RAM 912 storing various data and used as a work area when the CPU 910 executes various processes. Note that the RAM 912 includes an image memory 913 storing the above-described multivalued image data and plane data. Note that the plane data may be generated by the printer under the control of the controller 901, or may be inputted by the aforementioned image processor 7 or 107 through a data input unit 906. Alternatively, data generated by the image processor 7 or 107 may be directly stored in the image memory 6 or 106.

Reference numeral 902 denotes a head driver which inputs plane data corresponding to each ink-jet head unit, which is stored in the image memory 913, and outputs the data to the corresponding ink-jet head units to perform printing under the control of the controller 901. Reference numerals 903 and 904 denote motor drivers, respectively driving the corresponding carriage motor 30 and conveyance motor 26. Reference numeral 905 denotes a recovery mechanism portion comprising the recovery unit 32 or the like which is described in FIG. 7. The data input unit 906 comprises an interface in conformity with, e.g., centronics or RS232C or the like. Image data processed by an external device such as a host computer or by the image processor of the printer, is inputted to the data input unit 906.

Figure 13:
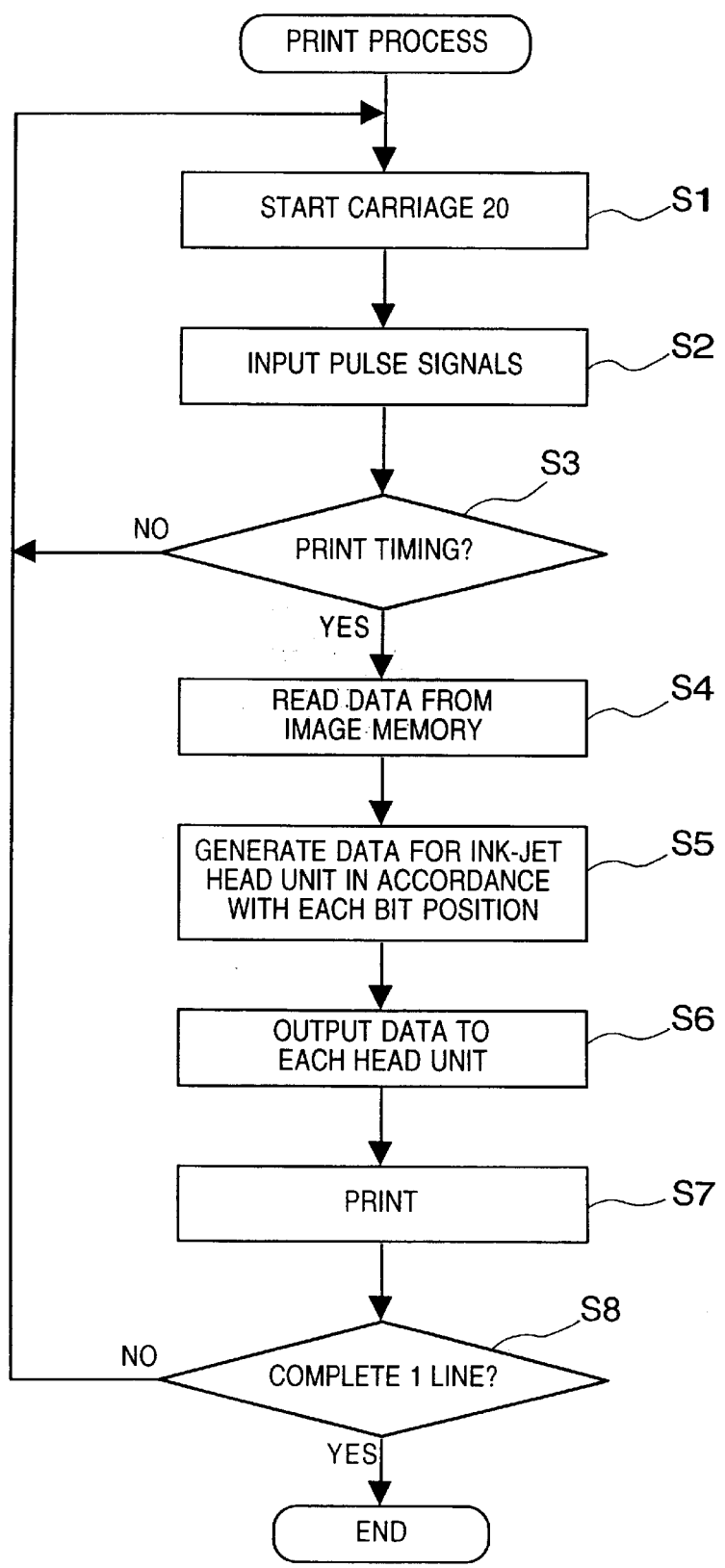
FIG. 13 is a flowchart showing a print process performed by the ink-jet printing apparatus according to the present embodiment.

FIG. 13 is a flowchart showing a print process performed by the ink-jet printing apparatus according to the present embodiment.

In step S1, moving of the carriage 20 is started by driving the carriage motor 30. In step S2, pulse signals are inputted from the linear encoder 28. In step S3, print timing for executing printing is determined based on the inputted pulse signals. When the print timing is determined, the process proceeds to step S4 where a plurality of plane data (see FIGS. 6 and 11), developed in the bit plane, are read out of the image memory 913. In step S5, print data corresponding to each ink-jet head unit is generated in accordance with the bit position of the data. Taking FIG. 6 as an example, the bit position 0 corresponds to the ink-jet head unit 21-1, and the subsequent bit positions respectively correspond to the ink-jet head units. In this manner, data corresponding to the number of ink discharge orifices of each ink-jet head unit is generated. Then, the process proceeds to step S6 where the generated plane data is outputted to the head driver 902 corresponding to each ink-jet head unit. In step S7, heat signals (head driving signals) are outputted to each ink-jet head unit and recording (printing) is performed. Then in step S8, it is determined whether or not printing for one band has been completed. If it has not been completed, the process returns to step S1, while if it has been completed, the process ends.

Note that in this flowchart, print data is generated at each print timing. However, the present invention is not limited to this. A buffer for storing data corresponding to one band may be provided for each ink-jet head unit. Before starting the moving of the carriage 20, print data for one band may be generated for each ink-jet head unit, and after the carriage 20 is started, the data may be sequentially read to drive each of the ink-jet head units. This also achieves high-speed printing.

In the embodiments described above, the recording apparatus comprises means (e.g., an electrothermal transducer, laser beam generator, and the like) for generating heat energy as energy utilized upon execution of ink discharge, and causes a change in state of ink by the heat energy. However, the means for discharging ink is not limited to the embodiments, but the piezoelectric device can be used to discharge ink. According to this printing method, a high-density, high-precision printing operation can be attained.

As the arrangement and principle of the ink-jet printing system using a means for generating heat energy to discharge ink, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse-form driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main unit and can receive ink from the apparatus main unit upon being mounted on the apparatus main unit, or a cartridge type printhead in which an ink tank is integrally arranged on the printhead itself, is applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Moreover, in each of the above-mentioned embodiments of the present invention, it is assumed that the ink is a liquid. Alternatively, the present invention may employ ink which is solid at room temperature or less, or ink which softens or liquefies at room temperature, or ink which liquefies upon application of a printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, ink which is solid in a non-use state and liquefies upon heating may be used. In any case, ink which liquefies upon application of heat energy according to a printing signal and is discharged in a liquid state, ink which begins to solidify when it reaches a printing medium, or the like, is applicable to the present invention. In the present invention, the above-mentioned film boiling system is most effective for the above-mentioned inks.

In addition, the image forming apparatus of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

As has been described above, according to the present embodiment, density of a pixel of interest is read out of the image memory 6, then binary process is performed on the pixel data, and binary data corresponding to each plane for printing the pixel of interest is stored in the address of the image memory where the pixel data (multivalued data) has been stored. By this, bit plane data corresponding to each ink-jet head unit can be stored in each address of the image memory. By virtue of this, the image memory and bit plane memory can be commonly utilized, enabling effective utilization of the memories.

Furthermore, since a plurality of planes of pixel data for printing one pixel are written in the address of the image memory corresponding to the pixel, it is no longer necessary to write data temporarily in other buffer memories or to perform bit shifting. Therefore, the number of accesses to the memory can be reduced and high-speed image processing is possible.

Still further, in a case of color image data, an ink-jet head unit to be used for printing is determined for each density component data (C, M, Y and K) of each pixel data, and error diffusion is performed for each density component data to determine the density value of each pixel. Accordingly, a color image having high quality and wide range of tones can be printed.

The present invention is not limited to the above embodiments and various changes and modifications can be made within the spirit and scope of the present invention. Therefore, to appraise the public of the scope of the present invention, the following claims are made.

What is claimed is:

1. An image processing apparatus for inputting multivalued image data and developing the image data into a plurality of bit planes, comprising:

a memory for storing the multivalued image data;

converting means for converting multivalued image data read out of the memory into binary data; and memory control means for controlling the memory such that binary data converted by said converting means is stored in an address of said memory where corresponding multivalued image data has been stored, wherein the binary data is recording data corresponding to a respective image recording element which performs recording based on the multivalued image data.

2. The image processing apparatus according to claim 1, wherein said converting means comprises distribution data storage means storing binary data indicative of a recording element to be driven in correspondence to a value of the multivalued image data.

3. The image processing apparatus according to claim 1, wherein said converting means diffuses an error between density of a pixel of interest to be recorded by the image recording element based on the binary data and density of the pixel of interest expressed by the multivalued image data, to periphery pixels of the pixel of interest.

4. The image processing apparatus according to claim 1, wherein the image recording element is provided in accordance with a type of ink in order to record an image in correspondence with the multivalued image data.

5. The image processing apparatus according to claim 1, wherein the multivalued image data is color image data, and
said converting means converts color component data of the color image data into binary data which corresponds to an image recording element provided for recording a respective color.

6. The image processing apparatus according to claim 1, wherein said converting means further diffuses an error between a color image density of a pixel of interest to be recorded by the image recoding element for a respective color based on the binary data and corresponding color image density of the pixel of interest expressed by the multivalued image data, to corresponding color image data of periphery pixels of the pixel of interest.

7. The image processing apparatus according to claim 1, wherein a number of bits of the multivalued image data stored in said memory is greater than a number of bits of the binary data converted by said converting means.

8. An image processing method for inputting multivalued image data and developing the data into a plurality of bit planes, comprising the steps of:
inputting the multivalued image data and storing the data in a memory;
converting multivalued image data read out of the memory into binary data where the binary data corresponds to a respective image recording element for performing recording based on the multivalued image data; and
controlling the memory such that the binary data converted in said converting step is stored in an address of the memory where corresponding multivalued image data has been stored.

9. The image processing method according to claim 8, wherein in said converting step, the multivalued image data is converted into binary data by referring to a distribution data table storing binary data indicative of a recording element to be driven in correspondence to a value of the multivalued image data.

10. The image processing method according to claim 8, wherein in said converting step, an error between a density of a pixel of interest to be recorded by the image recording element based on the binary data and a density of the pixel of interest expressed by the multivalued image data is diffused to periphery pixels of the pixel of interest.

11. The image processing method according to claim 8, wherein the image recording element records an image, using ink having different densities.

12. The image processing method according to claim 8, wherein a number of bits of the multivalued image data stored in said memory is greater than a number of bits of the binary data converted by said converting step.

13. An image forming apparatus for inputting multivalued image data and forming an image on a recording medium, comprising:
a plurality of image forming means for forming an image, each of said image forming means comprising a predetermined image forming characteristic;
a memory for storing the multivalued image data;
converting means for converting multivalued image data read out of said memory into binary data respectively corresponding to said plurality of image forming means; and
memory control means for controlling the memory such that binary data converted by said converting means is stored in an address of the memory where corresponding multivalued image data has been stored.

14. The image forming apparatus according to claim 13, wherein each of said plurality of image forming means comprises ink-jet printing means which forms an image by using plural types of ink.

15. The image forming apparatus according to claim 14, wherein said ink-jet printing means comprises a plurality of ink discharge orifices each having a corresponding heater, wherein heat of the heater changes a state of ink near the heater and causes the ink to discharge from each of said plurality of ink discharge orifices.

16. The image forming apparatus according to claim 13, wherein said converting means comprises distribution data storage means for storing binary data indicative of which of the plurality of image forming means is to be driven in correspondence to a value of the multivalued image data.

17. The image forming apparatus according to claim 13, wherein said converting means further comprises:
calculating means for obtaining image density of a pixel of interest to be formed based on binary data stored in a distribution data storage means; and
error diffusion means for diffusing a difference between the image density of the pixel of interest obtained by said calculating means and image density of the pixel of interest based on the multivalued image data stored in the memory to periphery pixels of the pixel of interest.

18. The image forming apparatus according to claim 13, wherein each of said plurality of image forming means corresponds to a bit of the binary data.

19. The image forming apparatus according to claim 13, wherein the multivalued image data is color image data, and
said converting means converts color component data of the color image data into binary data which corresponds to each of the plurality of image forming means respectively having a predetermined image forming characteristic.

20. The image forming apparatus according to claim 13, wherein said converting means further diffuses an error between a density of a pixel of interest to be formed by said image forming means for a color based on the binary data and corresponding color density of the pixel of interest expressed by the multivalued image data, to corresponding color data of periphery pixels of the pixel of interest.

21. The image forming apparatus according to claim 13, wherein a number of bits of the multivalued image data stored in said memory is greater than a number of bits of the binary data converted by said converting step.

* * * * *

UNITED STATES PATENT AND TRADEMARK OFFICE
CERTIFICATE OF CORRECTION

PATENT NO. : 6,231,149 B1
DATED : May 15, 2001
INVENTOR(S) : Matsumoto

It is certified that error appears in the above-identified patent and that said Letters Patent is hereby corrected as shown below:

Column 2,
Line 38, "ink) The" should read -- ink). The --.

Column 3,
Line 7, "follows" should read -- follow --.

Column 15,
Line 16, "recoding" should read -- recording --.

Signed and Sealed this

Twenty-sixth Day of March, 2002

Attest:

JAMES E. ROGAN
*Attesting Officer*  *Director of the United States Patent and Trademark Office*